United States Patent [19]

Lepere

[11] 4,233,604
[45] Nov. 11, 1980

[54] RECEIVER WITH FIXED-ECHO SUPPRESSOR

[75] Inventor: Guy Lepère, Paris, France
[73] Assignee: Thomson-CSF, Paris, France
[21] Appl. No.: 963,989
[22] Filed: Nov. 27, 1978
[51] Int. Cl.³ .............................................. G01S 7/34
[52] U.S. Cl. .............................................. 343/7 AG
[58] Field of Search ....................... 343/7 AG, 100 LE

[56] References Cited

U.S. PATENT DOCUMENTS

| 3,487,405 | 12/1969 | Molho et al. | 343/7 AG X |
| 3,755,813 | 8/1973 | Evans et al. | 343/7.7 |
| 3,781,883 | 12/1973 | Effinger et al. | 343/7 A |
| 3,786,506 | 1/1974 | Effinger et al. | 343/7 AG X |
| 4,144,533 | 3/1969 | Van Hijfte et al. | 343/7 AG |

Primary Examiner—Malcolm F. Hubler
Attorney, Agent, or Firm—Karl F. Ross

[57] ABSTRACT

A receiver of a pulse-type radar has a main i-f channel feeding a fixed-echo suppressor of limited dynamic range and, in parallel therewith, an ancillary channel of extended dynamic range including a logarithmic amplifier and a processor. The latter averages the amplitude of incoming echo signals over a range-and-azimuth cell and then over one or more antenna revolutions. The resulting mean value of the signal amplitude is used to control the gain of a linear amplifier in the main channel so as to adapt the dynamic range of the echo signals to that which can be handled by the fixed-echo suppressor.

8 Claims, 6 Drawing Figures

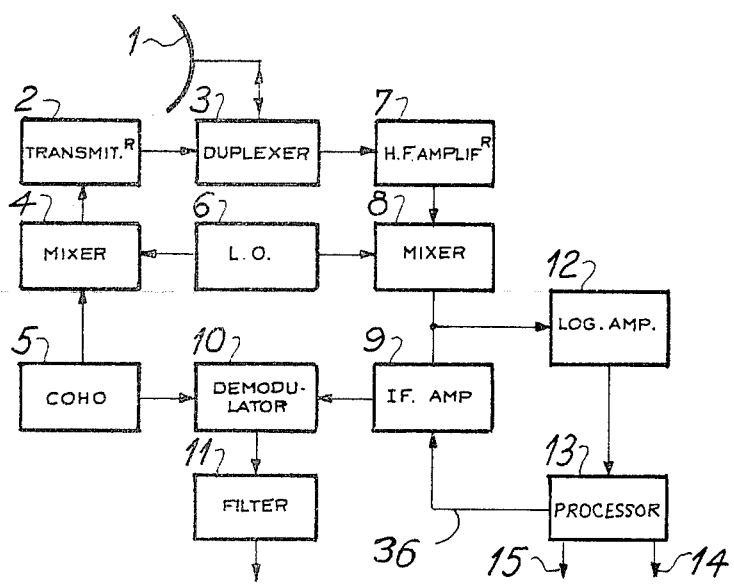
Fig_1
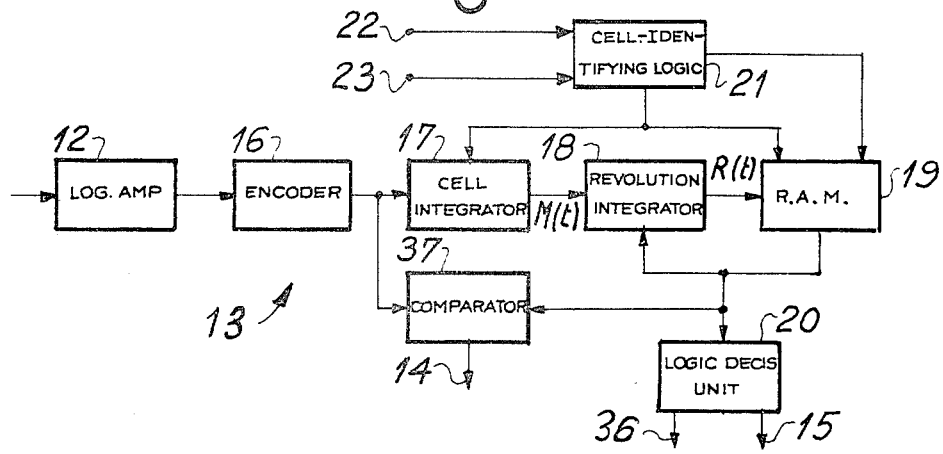
Fig_2
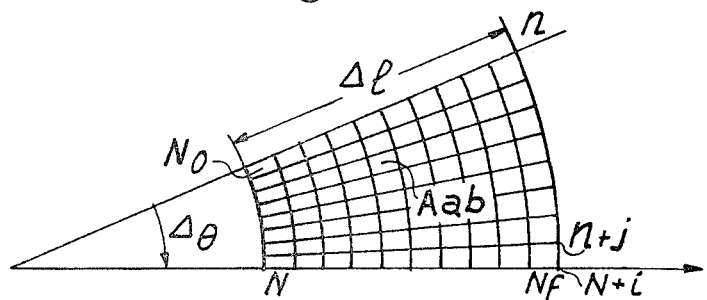
Fig_3

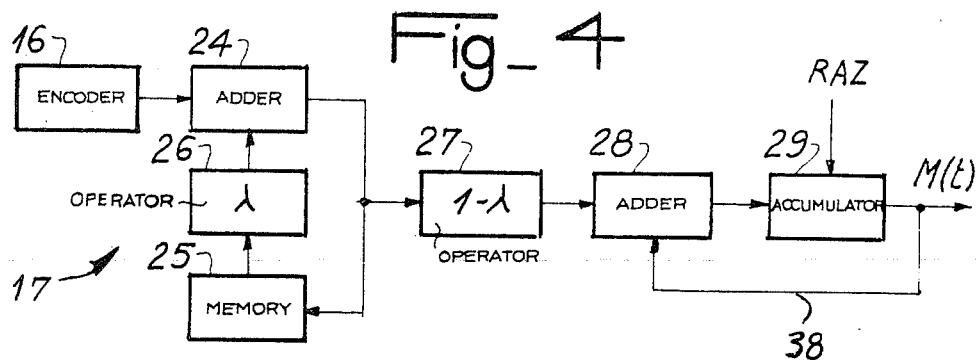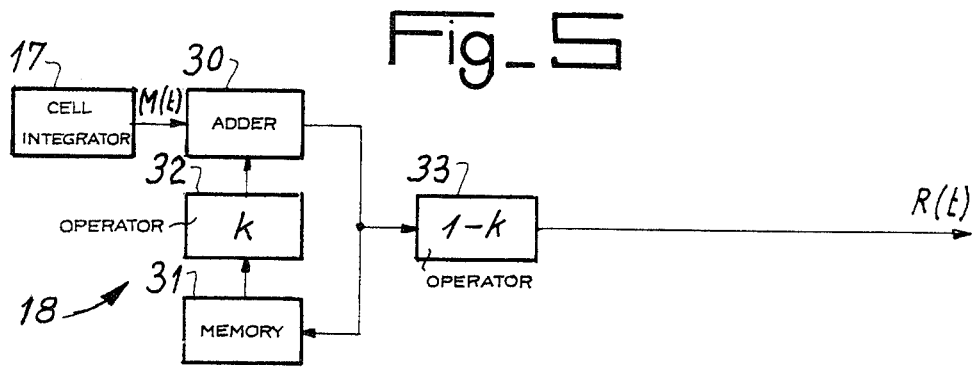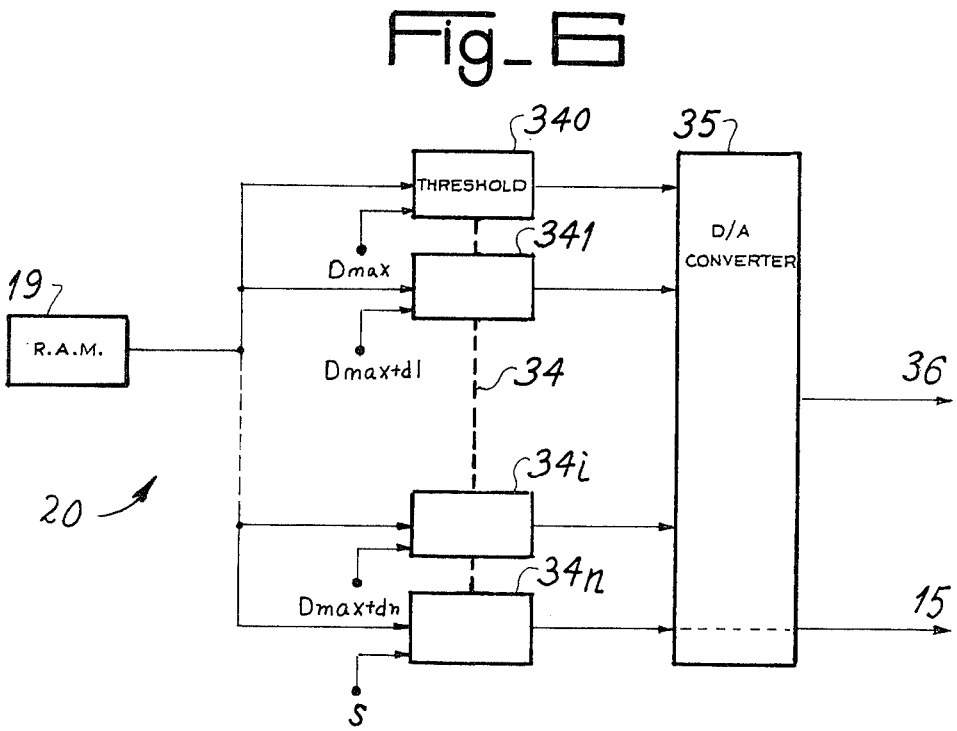

RECEIVER WITH FIXED-ECHO SUPPRESSOR

FIELD OF THE INVENTION

My present invention relates to a radar receiver provided with a fixed-echo suppressor.

BACKGROUND OF THE INVENTION

By fixed echoes are meant the signals received by a radar which originate from fixed or slow moving targets such as buildings, hills, trees, as well as clouds, angel echoes or waves, all these being unwanted signals which are referred to as "clutter". This term will be used in the following description to designate such unwanted signals which, when mixed with useful signals, tend to mask them. Thus, originating as they do from fixed or very slow-moving targets, these clutter signals must be suppressed if radar equipment is to be operated properly.

A number of arrangements for suppressing fixed echoes in a radar are known and it will be helpful to refer to the analyses and descriptions of them which appear for example in volume 2, chapter 13 of "Physique et théorie du radar" by J. Darricau, or in chapter 17 of the "Radar Handbook" by Merril I. Skolnik.

However, it generally appears that the dynamic range of signals which can effectively be dealt with by means of fixed-echo cancelers is very much less than the dynamic range of signals reflected by fixed clutter. It will be recalled that by the dynamic range of signals is meant the maximum variation in their amplitude.

Thus, to enable fixed echoes to be canceled satisfactorily, it is necessary to reduce the dynamics of the signals to be handled. To solve this particular problem various methods have been suggested and used; mention may be made, inter alia, of amplitude-limiting means in an intermediate-frequency radar amplifier having a lin-log (or linear-logarithmic) characteristic, amplifiers whose gain is variable with time (GTC amplifiers) and which are programmed as a function of the level of fixed echoes at a given radar site, and automatic-gain-control (AGC) circuits.

However, gain-limiting circuits in the intermediate-frequency amplifier of the radar have the drawback of severely reducing the performance of fixed-echo suppressors because they operate under non-linear conditions. Amplifiers whose gain is variable with time and which are programmed in a set fashion have the disadvantage of being ill-adapted to changes in the levels of fixed echoes due to fluctuations in the propagation of the radio-electrical waves.

Automatic-gain-control circuits are also well known in radio receivers, in which the bipolar video signal obtained from the output of the detector connected to the linear intermediate frequency amplifier is rectified and integrated over a few radar pulses and the resulting signal is applied as negative feedback to the intermediate-frequency amplifier so as to control its gain, have the drawbacks of being difficult to implement and of relatively poor performance.

OBJECT OF THE INVENTION

The object of my present invention is to provide an improved signal receiver taking into account all the fixed or substantially fixed echoes encountered in the sweep of the radar beam for automatically and continuously matching the dynamics of the incoming signals to the dynamic range of a fixed-echo suppressor-included in that receiver.

SUMMARY OF THE INVENTION

A signal receiver according to my invention has a main channel, feeding a fixed-echo suppressor of limited dynamic range, and an ancillary channel of extended dynamic range, both channels receiving incoming echo signals from a rotating antenna periodically emitting outgoing pulses; the main channel includes amplitude-adjusting means responsive to a control signal from the ancillary channel. The latter channel comprises logical circuitry responsive to synchronization and antenna-position signals for dividing the area swept by the radar into a predetermined number of range and azimuth cells each encompassing a plurality of pulse-repetition cycles, a first integrator controlled by this logical circuitry for averaging the amplitudes of the incoming echo signals over each one of these cells, a second integrator averaging over one or more antenna revolutions the mean amplitude values obtained for each cell by the first integrator in cascade therewith, and evaluating or decision means downstream of the second integrator for deriving the aforementioned control signal from the resulting amplitude value. This latter value may be temporarily stored in a memory inserted between the second integrator and the evaluating means; the memory, advantageously, has randomly accessible addresses respectively assigned to the several range and azimuth cells.

BRIEF DESCRIPTION OF THE DRAWING

The above and other features of my invention will now be described in detail with reference to the accompanying drawing in which:

FIG. 1 is a block diagram of a signal receiver according to the invention in an associated radar system;

FIG. 2 is a more detailed block diagram of a processor included in the receiver of FIG. 1;

FIG. 3 shows a range-and-azimuth cell;

FIG. 4 is a block diagram showing details of an integrating unit forming part of the processor of FIG. 2;

FIG. 5 is a block diagram showing details of another integrating unit included in the processor; and FIG. 6 is a schematic view showing details of a decision logic also included in the processor.

SPECIFIC DESCRIPTION

The radar diagrammatically shown in FIG. 1, of which only the parts which have some bearing on the invention will be described, comprises an antenna 1 connected via a duplexer 3 to a transmitter 2 emitting periodic pulses and to a high-frequency amplifier 7. A mixer 4 connected to the outputs of a local oscillator 6 and a coherent oscillator 5 works into transmitter 2; amplifier 7 feeds a second mixer 8 also connected to another output of local oscillator 6. The mixer 8 drives an intermediate-frequency amplifier 9, having a linear characteristic, working into a demodulator 10 which is driven by the coherent oscillator 5 and which feeds a filtering circuit 11 designed to suppress the fixed echoes. The output of mixer 8 is also connected to an amplifier 12, having a logarithmic characteristic, which in turn is connected to a calculating circuit 13 controlling the gain of the linear amplifier 9 via a connection 36. The calculating circuit or processor 13 has two other outputs 14 and 15 which will be discussed hereinafter.

The operation of the signal receiver embodying my invention is as follows. Intermediate-frequency video signals which consist of the useful signals and the clutter signals are applied to the i-f amplifier 12, whose characteristic is logarithmic and which is thus capable of receiving signals of very high amplitude without being saturated and of emitting signals whose amplitude is proportional to the logarithm of the amplitude value of the input signals. This amplifier comprises a detector so that the output signals are video signals. The signals coming from the logarithmic amplifier 12 are applied to the calculating circuit or processor 13. The calculating circuit 13 makes a continuous measurement of the amplitude of the clutter echoes, which it averages over a cell defining an elementary area in range and azimuth. Such a cell may be a resolution cell of the radar which is characterized by an elementary distance measured by the length of the radar pulse and by an elementary azimuth angle equal to the angular width of the antenna beam.

Then, still in processor 13, this mean value is integrated over a plurality of antenna revolutions so that, after integration the processor can give the mean value of the fixed echoes anywhere in the radar cover, thus producing a true "dynamic-clutter map" not to be confused with the clutter maps produced by storage tubes. With continuous knowledge of the mean value of the fixed echoes it is possible to control the gain of the linear intermediate-frequency amplifier 9 in the normal channel of the signal receiver, which contains a variable-gain stage, so that its dynamic range will be matched to that of the signals which it has to deal with.

The signals emerging from the linear amplifier 9 in the normal channel are then demodulated in the coherent demodulator 10 connected to the coherent oscillator 5. The demodulator delivers, in known fashion, bipolar video signals which are then processed, once again in a conventional manner, in the so-called fixed-echo-suppression filters 11 which in this way supply the useful signals.

FIG. 2 shows, in schematic form, the processor or calculating circuit 13 which gives the mean value of the amplitude of the fixed clutter echoes.

Starting from the logarithmic amplifier 12, this processor comprises an encoding circuit 16, a circuit 17 for integrating over a range and azimuth cell of the radar, a circuit 18 for integrating over a plurality of antenna revolutions, a random-access memory 19, a logic decision unit 20 evaluating the results of integration, and a so-called cell-identifying logic unit 21 which receives synchronizing the signals for the radar-pulse emission at an input 22 and information on the rotary position of the antenna, i.e. azimuth information, at another input 23.

The encoding circuit 16 connected to the output of the logarithmic amplifier 12 is responsible for quantizing the received video signals with a certain resolution. In one embodiment, the sampling quantum is selected to be of the order of 800 ns and the coding uses 8 bits. The quantized signals representing amplitude are then applied to component 17 for integration over a range-and-azimuth cell as discussed above which, as shown in FIG. 3, extends over an elementary distance $\Delta l$ and covers an elementary azimuth angle $\Delta\theta$; the entire air space covered by the radar is divided up into a predetermined number of such elementary cells. In range, each cell extends from a quantum $N$ to a quantum $N+i$ and covers a plurality of repetition periods or pulse cycles such as cycle $n$ to cycle $n+j$.

At a given moment, in a cell, a signal which may be termed a coded video sample in present at a specific range quantum and at an equally specific azimuth quantum.

Since each cell contains a number of samples equal to $(j+1)\cdot(i+1)$, knowledge of the amplitude A of a sample makes it possible to determine the mean of the amplitudes of the samples in a cell, viz:

$$M(t) = \frac{1}{(j+1)(i+1)} \sum_{a=n}^{a=n+j} \sum_{b=n}^{b=n+i} A_{ab} \qquad (1)$$

in which formula a is a range quantum and b an azimuth quantum corresponding to a certain repetition cycle. The formula shows that the mean of the amplitudes of the video signals for a cell is calculated for a constant range beginning at the start-of-cell quantum $N_0$ and that summing takes place during the last repetition cycle in the so-called end-of-cell quantum $N_f$ and at the end-of-cell azimuth.

By way of example, I shall now explain the calculation of the mean of the video signals in a cell by means of the first-order integrator 17 more fully illustrated in FIG. 4.

In a first section of this integrator comprising an adder 24, a memory 25 having a one-repetition-cycle capacity, and a feedback circuit with an operator 26 having an integration coefficient, $\lambda$ in accordance with the number of samples to be integrated in azimuth (which number may vary slightly from one cell to another), the samples are summed in one range slot. From this section is obtained a value $ma(n+i)$ which, with the notation already used, represents the mean value of a video signal in azimuth calculated at a constant range. In a second section, comprising an adder 28 and an accumulator circuit 29 with a feedback loop 38, the result supplied by the first section, having been assigned a coefficient $(1-\lambda)$ by an operator 27, is summed. In fact, the mean azimuthal value calculated at a constant range can be expressed as follows:

$$ma(n+i) = \frac{1}{i+1} \sum_{b=n}^{n+1} A_{ab} \qquad (2)$$

This value may be determined by approximation using the following recursive formula:

$$ma(n+i) = (1-\lambda)A_a(n+i) + ma(n+i-\lambda) \qquad (3)$$

In the second section of the integrator in FIG. 4 the mean value of the video signals in the cell is calculated, viz:

$$M(t) = \frac{1}{1+j} \sum_{a=N}^{N+j} ma(n+i) \qquad (4)$$

A zero-reset signal RAZ applied to accumulator 29 is a so-called start-of-cell signal.

The cells are defined and identified in the logic circuit 21 of FIG. 2 which, as will be recalled, receives at its input 22 the synchronization pulses determining the repetition cycles and at its input 23 the information on the rotary position of the radar antenna. These signals enable the timing signals to be produced which are necessary for the operation of the receiver, namely the start-of-cell and end-of-cell signals which are applied to the integrator 17 and are read out from and written in the memory 19. The memory can, for example, be randomly addressed and in one embodiment contains nearly 16,000 9-bit words. Each address in the memory corresponds to a given range and azimuth cell. The memory also receives information from the integrating circuit 18 which is designed to average, over one or more antenna revolutions, the coded and sampled video signal.

FIG. 5 shows more fully the integrating circuit 18 averging the mean amplitude M(t) of the pre-integrated video signals over a desired number of antenna revolutions. The result R(t) of this integration, temporarily stored in memory 19 and read out therefrom to evaluator 20, gives the mean value of the amplitude of fixed echoes anywhere in the radar coverage. The integrating circuit 18 comprises an adder 30 connected to component 17 (FIG. 2) and a memory 31 which stores the results over one antenna revolution and whose output is connected to the adder via a feedback loop with an operator 32 having a coefficient k. The result R(t) at the output of the integrator 18 is supplied by an operator 33 which applies a coefficient 1−k.

FIG. 6 is a schematic view of the decision logic or evaluator identified by reference numeral 20 in FIG. 2. Advantageously, this decision circuit, connected to the output of the memory 19 storing the mean value of the amplitude of the fixed echoes which have been integrated over a plurality of antenna revolutions, comprises a number of threshold circuits generally designated 34 working into a digital-to-analog converter 35 whose output 36 supplies the signal for controlling the gain of the linear intermediate-frequency amplifier 9 of the fixed-echo suppressor shown in FIG. 1.

The threshold circuits such as 340, 341 . . . 34i are connected to sources of reference voltage which set thresholds corresponding to values of the gain of the linear amplifier 9. To be particularly considered are a threshold called Dmax which corresponds to the maximum gain Go of the linear amplifier, a threshold Dmax+dn corresponding to the minimum gain Gn of the linear amplifier, and a threshold Dmax+d1 corresponding to an intermediate gain G1 of the amplifier. Other threshold values D2, D3 etc. corresponding to intermediate values of gain may be envisaged. It will be noted that Dmax gives an indication of the maximum dynamic range of the linear amplifier, that is to say the maximum signal amplitude value which can be handled. It is thus clear that the decision unit 20 enables the dynamic range of the signal to be matched to that which can be handled by the fixed-echo suppressor.

The active inputs of the threshold circuits 34 are connected in parallel to the output of memory 19 so that the signals R(t) relating to the echoes in specific cells in one antenna revolution, are applied in parallel to the threshold circuits, which can then make comparisons with reference signals and emit signals for controlling the gain of the linear amplifier 9, doing so in real time.

If the mean value of the amplitude of the clutter signals in the previous revolution, i.e. R(t−1), is less than the value of threshold Dmax, the linear amplifier will be adjusted to the maximum gain Go. If this value R(t−1) is greater for example than the value of threshold Dmax+d1, the linear amplifier 9 will be adjusted to the intermediate gain G1, and if the value R(t−1) is greater than the value of threshold Dmax+dn, the linear amplifier will be adjusted to the minimum gain Gn.

Thus, my invention provides means for suppressing clutter signals or fixed echoes in a radar receiver whose ability to handle signals having a wide dynamic range is adjusted by the signals themselves, which are processed in such a way as to control the gain of a linear amplifier of that receiver inversely with the signal amplitudes as averaged over the area swept by the radar beam.

It may however be mentioned that the circuitry for processing these clutter signals and controlling the gain of the amplifier is able to provide other information which is conventionally supplied by special equipment. More particularly, the decision logic 20 described with reference to FIG. 6 may include an additional threshold circuit 34n connected to a source of reference voltage establishing a threshold S with which the value R(t−1) is compared. If the value R(t−1) is greater than this threshold, there is clutter present; this information appears at an output 15 of the digital/analog converter 35 and the video signal processed in the fixed-echo suppressor (i.e. the output signal of filter circuit 11) is selected, in contrast to the untreated video signals which could otherwise be used. In the prior art, this selection takes place after detection of what are generally termed "density zones" in the radar repetition cycle or on the basis of the aforementioned clutter maps produced with the help of storage tubes. In accordance with the invention, and as described above, this detection is performed after a first integration over a cell covering a plurality of repetition cycles and a second integration over one or more antenna revolutions.

It is also possible, in accordance with the invention, to determine targets whose echo amplitude is greater than that of the clutter; that function is conventionally performed by devices known by the name "area MTI" suppressors, of which a description can be found in the above-cited book by Merrill I. Skolnik, chapter 17-54. As shown in FIG. 2, it is merely necessary for this purpose to provide a comparison circuit 37 connected between the encoding device 16, which supplies the amplitude Aab of a coded video sample, and the memory 19, furnishing the mean amplitude of the clutter echoes as averaged over one or more antenna revolutions, with which the former is compared. The output 14 of this comparator controls, for example, the display of the logarithmic video signal.

The signal processor 13, which may be expanded to perform other ancillary functions, is in practice produced entirely from conventional logic circuits and MOS integrated-circuit memories.

What is claimed is:

1. In a radar system comprising a signal receiver with a main channel, feeding a fixed-echo suppressor of limited dynamic range, and with an ancillary channel of extended dynamic range, said channels receiving incoming echo signals from a rotating antenna periodically emitting outgoing pulses, said main channel including amplitude-adjusting means responsive to a control signal from said ancillar channel, the improvement wherein said ancillary channel comprises logical circuitry responsive to synchronization and antenna-position signals for dividing the area swept by the radar into a predetermined number of range-and-azimuth cells each encompassing a plurality of pulse-repetition cycles, first integrating means controlled by said logical circuitry for averaging the amplitudes of said incoming echo signals over each one of said cells, second integrating means in cascade with said first integrating means for averaging over at least one antenna revolution the mean amplitude values thus obtained for each cell to generate a resulting amplitude value, and evaluating means downstream of said second integrating means for deriving said control signal from said resulting amplitude value.

2. A signal processor as defined in claim 1 wherein said ancillary channel further comprises a logarithmic amplifier upstream of said first integrating means, an encoder inserted between said logarithmic amplifier and said first integrating means for quantizing said echo signals, and a memory inserted between said second integrating means and said evaluating means for temporarily storing said resulting amplitude value.

3. A signal processor as defined in claim 2 wherein said amplitude-adjusting means comprises a variable-gain intermediate-frequency amplifier connected in parallel with said logarithmic amplifier to an output of a high-frequency stage.

4. A signal processor as defined in claim 2 or 3, further comprising comparison means with input connections to outputs of said encoder and said memory for signaling the detection of a target in response to an instantaneous echo-signal amplitude exceeding said resulting amplitude value.

5. A signal processor as defined in claim 2 or 3 wherein said memory has randomly accessible addresses respectively assigned to said cells.

6. A signal processor as defined in claim 3 wherein said evaluation means comprises a plurality of threshold comparators with first inputs connected in parallel to said memory and with second inputs connected to respective sources of reference voltages of different levels, said evaluation means further comprising output means connected to said threshold comparators for modifying said control signal in accordance with the highest reference-voltage level surpassed by said resulting amplitude value to vary the gain of said intermediate-frequency amplifier inversely with the magnitude of said resulting amplitude value.

7. A signal processor as defined in claim 6 wherein one of said threshold comparators has an output connection emitting a signal indicative of the presence or absence of clutter.

8. A signal processor as defined in claim 1, 2, 3, 6 or 7 wherein said first integrating means comprises a first adder with a feedback loop including a first storage circuit with a capacity of one pulse-repetition cycle and a second adder down-stream of said first adder with a feedback loop including a second storage circuit resettable by start-of-cell signals from said logical circuitry, said second integrating means comprising a third adder with a feedback loop including a third storage circuit with a capacity of at least one antenna revolution.

* * * * *